United States Patent
Sosnik

(10) Patent No.: US 7,282,651 B2
(45) Date of Patent: Oct. 16, 2007

(54) METHOD AND APPARATUS FOR WEIGHING FRAGILE ITEMS

(76) Inventor: Al Pinhas Sosnik, 9555 Owensmouth Ave., #16, Chatsworth, CA (US) 91311

( * ) Notice: Subject to any disclaimer, the term of this patent is extended or adjusted under 35 U.S.C. 154(b) by 0 days.

(21) Appl. No.: 11/193,927

(22) Filed: Jul. 28, 2005

(65) Prior Publication Data

US 2007/0095578 A1  May 3, 2007

(51) Int. Cl.
*G01G 13/04* (2006.01)
(52) U.S. Cl. ............................ 177/116; 222/77
(58) Field of Classification Search .............. 177/105, 177/116, 145; 222/77
See application file for complete search history.

(56) References Cited

U.S. PATENT DOCUMENTS

| | | | | |
|---|---|---|---|---|
| 2,896,384 A | * | 7/1959 | Carlsen et al. ............... | 53/502 |
| 3,021,656 A | * | 2/1962 | De Vries ...................... | 53/248 |
| 3,567,072 A | * | 3/1971 | Tenhulzen .................... | 222/77 |
| 3,695,371 A | * | 10/1972 | Sheetz ........................ | 177/59 |
| 4,250,690 A | * | 2/1981 | Lorenzen et al. ............. | 53/475 |
| 4,750,419 A | * | 6/1988 | Meredith ...................... | 101/40 |
| 4,815,258 A | * | 3/1989 | Jesperson et al. ............. | 53/473 |
| 4,965,982 A | * | 10/1990 | Jesperson et al. ............. | 53/248 |

\* cited by examiner

*Primary Examiner*—Randy W Gibson
(74) *Attorney, Agent, or Firm*—Freilich, Hornbaker & Rosen

(57) ABSTRACT

A system for weighing items sequentially delivered by a feeder subsystem in order to discharge batches of items having a desired target weight; and more particularly to a method and apparatus particularly configured to handle fragile items, e.g. strawberries, cherries, etc., to reduce bruising such items during the weighing process. The invention includes a container for receiving discrete items sequentially delivered by an item feeder together with means for measuring the weight of items accumulated in the container. The weighing container is located for movement between a first position at which a product receiving surface is oriented substantially horizontally in close proximity to the output location, for receiving product items from the output location, and a second position at which the container is oriented to accommodate an increased volume of items. The weighing apparatus includes means for moving the container from the first position to the second position and discharging the target weight of items.

6 Claims, 4 Drawing Sheets

FIRST POSITION

SECOND POSITION

FIRST POSITION

SECOND POSITION

METHOD AND APPARATUS FOR WEIGHING FRAGILE ITEMS

FIELD OF THE INVENTION

This invention relates generally to systems for weighing items sequentially delivered by a feeder subsystem in order to discharge batches of such items having a desired target weight; and more particularly to a method and apparatus particularly configured to handle fragile items, e.g. strawberries, cherries, grapes etc., to reduce bruising such items during the weighing and packaging process.

BACKGROUND OF THE INVENTION

Various systems, e.g., see U.S. Pat. No. 6,502,013, are described in the prior art for rapidly filling small containers, e.g., one, three, or five pound, with discrete items, e.g., beans, nuts, hard candy, fruit items, etc. Such systems typically include a feeder subsystem that sequentially feeds the items to at least one weighing container. A controller monitors the weight of the items accumulated in the weighing container(s) and then causes a desired batch to be discharged therefrom. Such systems can use various procedures, e.g., "linear weigh" or "combination weigh", to discharge the desired batch. It is typical for the feeder subsystem, e.g., a conveyor belt or vibratory feeder, to release the items so they drop by gravity into the weighing container. The drop can cause bruising of fragile items such as strawberries, cherries, etc.

SUMMARY OF THE INVENTION

The present invention is directed to an automatic weighing method and apparatus particularly configured for delivering fragile items from a feeder into a weighing container in a manner that minimizes item bruising. More particularly, the invention is directed to a method and apparatus for minimizing the drop height and momentum of items transitioning from the feeder to the weighing container.

An apparatus in accordance with the invention includes a weighing container for receiving discrete items sequentially delivered by an item feeder together with means for measuring the weight of items accumulated in the container. The weighing container is located so that the items move from the feeder onto a receiving surface of the container. In accordance with the invention, the receiving surface is mounted for movement between a first position and a second position. In the first position, the receiving surface is oriented substantially horizontally in close proximity to the feeder output for gently receiving items therefrom. In the second position, the receiving surface is spaced further from the feeder output and typically enables the container to accommodate an increased volume of items.

In a preferred embodiment of the invention, a mechanism for moving the receiving surface from the first position to the second position acts in response to the measured weight of items in the weighing container. In an alternative embodiment, the mechanism could respond to a certain elapsed time or the cumulative volume of items in the weighing container.

In the preferred embodiment, a controller monitors the weight of the items accumulating in the weighing container and upon reaching a first set point causes the receiving surface to move to its second position. When a target weight is reached, the content of the container is then discharged. Subsequently, the receiving surface is returned to its first position ready to accept additional items from the feeder.

DETAILED DESCRIPTION

Figure 1:
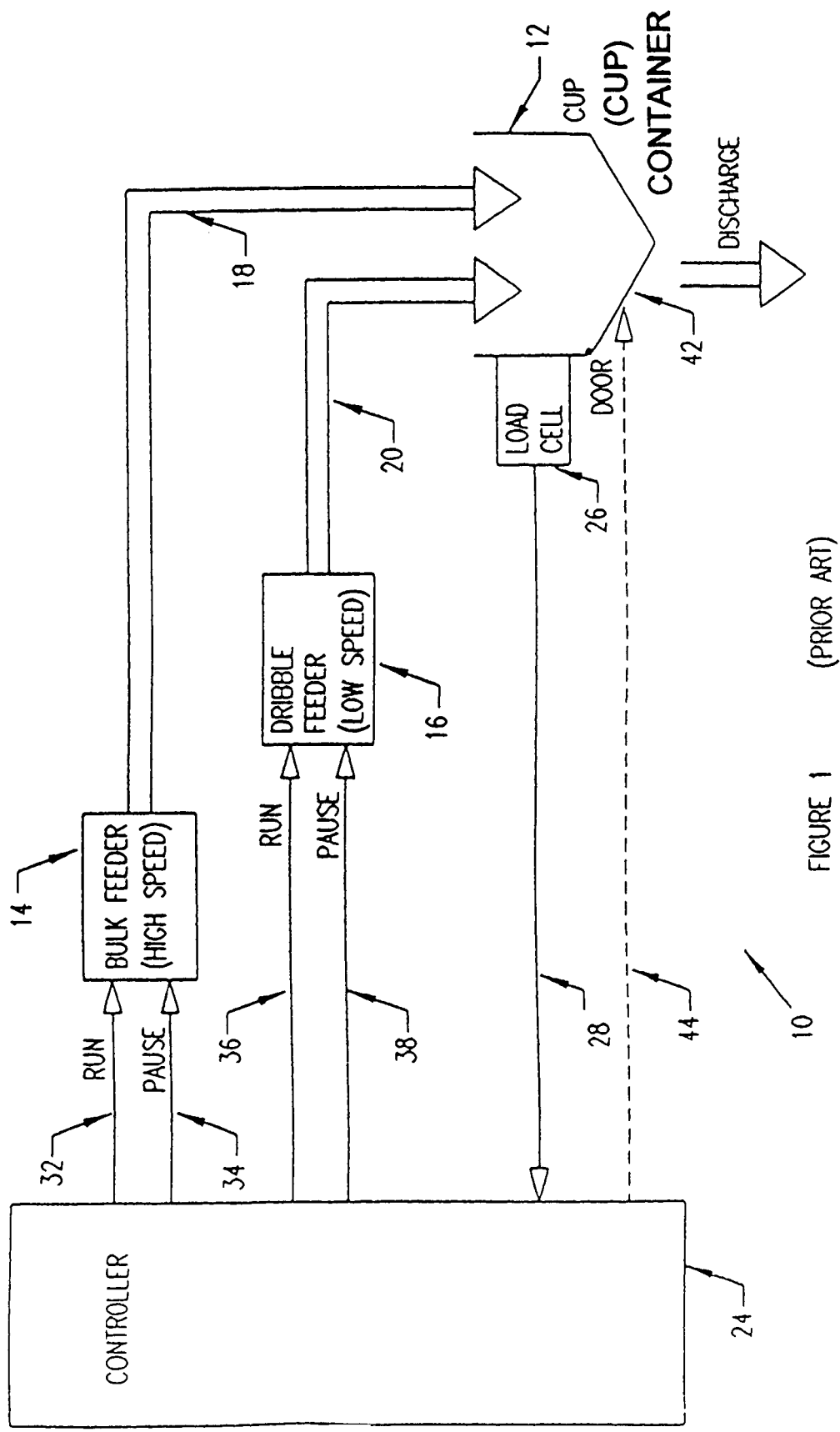
FIG. 1 is a block diagram of a typical prior art linear weighing system.

Attention is initially directed to FIG. 1 which illustrates an exemplary prior art linear weighing system 10. The system 10 includes a weighing container (or "cup") 12 which is fed by a bulk feeder 14 and a dribble feeder 16. The bulk feeder 14 is configured to deliver discrete items at a relatively high rate via path 18 to the weighing container 12. The dribble feeder 16 is configured to deliver the same items at a slower rate via path 20 to the weighing container 12. The bulk feeder 14 and the dribble feeder 16 are typically controlled by a common microprocessor based controller 24.

A weighing device, e.g., a load cell 26, is associated with the weighing container 12 to weigh the items accumulated in the weighing container 12 and provide an information signal via line 28 to the controller 24. The controller 24 responds to the information on line 28 to control the bulk feeder 14 via its RUN input 32 and its PAUSE input 34. Similarly, the controller 24 controls the operation of dribble feeder 16 via its RUN input 36 and its PAUSE input 38. Additionally, the controller typically controls a (gate/door mechanism 42 via line 44. When the gate/door 42 is closed, items can accumulate within the weighing container 12. When the gate/door 42 is open, the weighing container 12 content is discharged, e.g., into an end-product container (not shown).

In a typical prior art weighing system (whether "linear" or "combination"), the items typically drop by gravity from the feeder onto a floor surface of the weighing container. The height of the drop is typically determined by the size of the weighing container 12; e.g. one, three, five pounds, etc. While the drop may be of no consequence to hard or firm products such as beans, nuts, hard candy, hardware items, etc., the drop can cause bruising of fragile items such as strawberries, cherries, grapes etc. To reduce the bruising of such items, embodiments of the present invention are configured to minimize the drop height and momentum into the weighing container 12.

Figure 2:
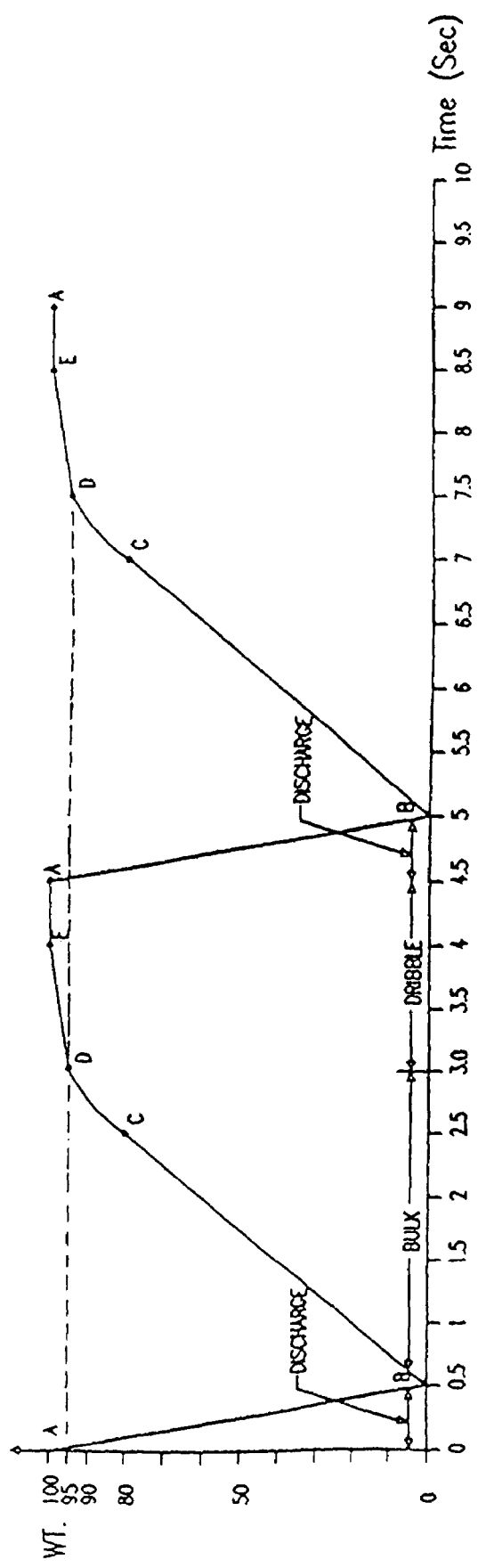
FIG. 2 is a timing chart plotting Target Weight Percentage vs. Time in accordance with the prior art of FIG. 1.

The operation of the prior art apparatus represented in FIG. 1 is depicted in FIG. 2 which plots Target Weight Percentage vs. Time. In FIG. 2, a cycle duration of 4.5 seconds has been assumed. The cycle duration is comprised of three principal phases, i.e. a discharge phase (0.5 seconds), a bulk feed phase (2.5 seconds), and a dribble feed phase (1.5 seconds). It should be understood that the aforementioned numbers are exemplary only and are merely intended to assist in understanding this description. In fact, the cycle and phase durations can vary considerably depending upon the particular hardware/software employed, the particular product being handled, the system geometry, etc.

In FIG. 2, the discharge phase beginning at Time=0 is represented by the line segment AB. This phase empties the weighing container 12 and prepares it to receive a new product load. At point B, the bulk feeder 14 and dribble feeder 16 are activated via RUN inputs 32, 36 to feed product pieces via paths 18, 20 into the weighing container 12. The increasing weight of the product in the weighing container 12 is represented by the substantially linear segment BC of FIG. 2. Point C represents a first setpoint and is typically set to about 80% of the ultimate target weight. When this first setpoint is recognized by the load cell 26 and controller 24, the controller will pause the bulk feeder 14 via PAUSE input 34. In real world applications, the content weight of the weighing container 12 continues to increase for perhaps half a second after the pause signal is sent to the bulk feeder 14. This is attributable to various effects such as product 'in the air' and component reaction time, and is represented by the segment CD in FIG. 2. At point D, the content weight is typically at approximately 95% of target weight. The controller 24 continues to run the dribble feeder 16 to increase the content weight at a slower rate from point D to point E. Point E represents the second setpoint and is typically set to 100% of target weight. Overshoot and settling time is represented by the segment EA. At point A (Time=4.5 seconds) the discharge phase of the next cycle begins. It should be appreciated that in the prior art device represented in FIG. 1, the bulk feed and dribble feed durations occur sequentially. In other prior devices, the bulk feed and dribble feed durations may occur with some overlap, e.g., see U.S. Pat. No. 6,502,013. In yet other prior devices, a cycle may consist of only one feeder discharging into the weighing container 12. In all such embodiments, the discharge phase of items from weighing container 12 begins at point A and ends at point B.

Figure 3A:
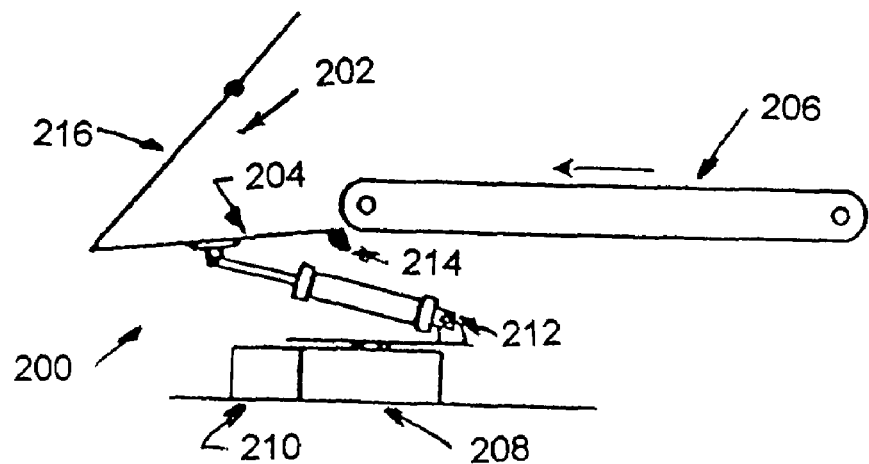
FIGS. 3A and 3B are block diagrams of a preferred weighing apparatus in first and second positions, respectively, in accordance with the present invention.
Figure 3B:
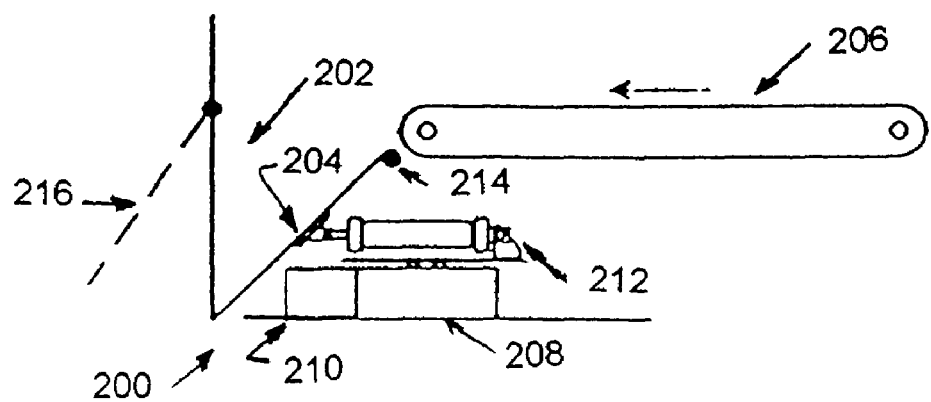

Attention is now directed to FIGS. 3A and 3B which illustrate a preferred embodiment 200 of the invention. This embodiment teaches the use of a weighing container (or cup) 202 having a receiving surface 204 that transitions from a first position shown in FIG. 3A to a second position shown in FIG. 3B. The first position (FIG. 3A) minimizes the item drop height and reduces the likelihood of items bruising as the items load into the weighing container 202. Thus, as items proceed from the feed mechanism 206, e.g., conveyor belt, to the weighing container 202, the items engage the weighing container 202 receiving surface 204 while such surface is oriented substantially horizontally in close proximity to the output location of the feed mechanism 206 (FIG. 3A). A weighing device, e.g. load cell 208 monitors the accumulated weight of items in the weighing container 202. At some predetermined weight setting, the controller 210 causes the actuator 212 to rotate the weighing container 202 receiving surface 204 around the pivot line 214. The weighing container 202 receiving surface 204 continues to rotate around the pivot line 214 until the weighing container 202 reaches its second position as shown in FIG. 3B. As the weighing container 202 continues to pivot, items continue to proceed from the feed mechanism 206 onto the weighing container 202. When the contents in the weighing container 202 reach the desired target weight, the controller 210 causes the gate (or door) mechanism 216 to operate to discharge the contents of the weighing container 202 into, e.g., an end-product container (not shown) and the next cycle begins.

Figure 4:
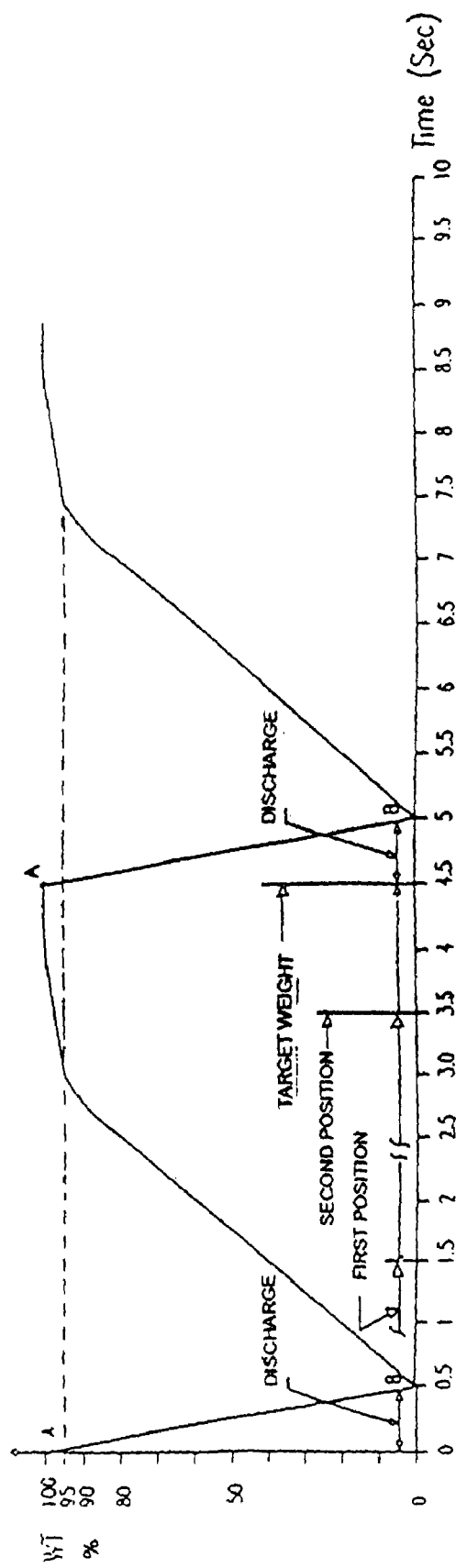
FIG. 4.

The operation of the embodiment illustrated in FIGS. 3A and 3B may be further explained. FIG. 2 plots Target Weight Percentage vs. Time wherein the same cycle duration of 4.5 seconds has been assumed. The cycle duration in FIG. 4, however, is comprised of four principal phases applicable to each discharge of the container 12; i.e. a discharge phase (0.5 seconds) beginning at point A and ending at point B, a first position phase (1.0 seconds), a transitional phase from first to second position (2.0 seconds) and a second position phase (1.0 seconds). As with the prior art apparatus of FIG. 2, it should be understood that the aforementioned numbers are exemplary only and are merely intended to assist in understanding this description. For illustrative purposes, A target rate is reached at point A after the second position has been reached. In fact, the position and phase durations can vary considerably depending upon the particular hardware/software employed, the particular items being handled, the system geometry, etc.

From the foregoing, it should now be appreciated that a method and apparatus has been disclosed herein for weighing fragile product items, such as fruit, in a manner that reduces the bruising of such items. Although the exemplary embodiment has been described herein for use in a linear weighing system, it should be understood that the teachings of the invention are equally applicable to other types of weighing systems, e.g., combination. Moreover, it should be understood that variations and modifications of the disclosed implementation may readily occur to those skilled in the art which are consistent with the spirit of the invention and within the intended scope of the appended claims. For example only, the controller 210 can be configured to move the receiving surface 204 in response to inputs other than accumulated weight, e.g., a predetermined time duration and/or a predetermined accumulated item volume within the weighing container 202. Also, the receiving surface 204 of the weighing container 202 can be alternatively configured, for example, in lieu of rotating, it can comprise a horizontal floor which is selectively raised and lowered. Similarly, the actuator 212 can be alternatively configured, e.g., a motor driven device can be used.

What is claimed is:

1. An apparatus for collecting discrete items sequentially delivered by an item feeder to an output location and for discharging a collected quantity of said items when the accumulated weight thereof matches a target weight, said apparatus comprising:

a container including an item receiving surface for receiving items delivered by said feeder to said output location, said item receiving surface mounted for movement between a first position whereat said surface is located close to said output location to minimize the drop height to said surface and a second position whereat said surface is located further from said output location to enable the container to accumulate an increased volume of items;

means for measuring the weight of items accumulating in said container;

means responsive to said weight measuring means for moving said item receiving surface from said first position toward said second position while said container continues to receive items from said output location; and means responsive to said weight measuring means for discharging items accumulated in said container when the measured weight thereof matches said target weight.

2. The apparatus of claim 1 wherein said means for moving said item receiving surface includes means for rotating said surface around a pivot line.

3. A method of collecting discrete items delivered by an item feeder to an output location and for discharging a collected quantity of said items when the accumulated weight thereof matches a target weight, said method comprising:

providing a container for receiving items delivered by said feeder to said output location;

locating an item receiving surface in said container at a first position close to said output location to minimize the drop height from said feeder onto said item receiving surface:

measuring the weight of items as they accumulate in said container;

responding to said weight measuring to move said item receiving surface toward a second position further from said output location while said container continues to receive items from said output location; and responding to said weight measuring indicating that the measured weight of items accumulated in said container matches said target weight for discharging said items from said container.

4. The method of claim 3 wherein said step of moving said item receiving surface includes rotating said surface around a pivot line.

5. An apparatus for collecting discrete items sequentially delivered by an item feeder to an output location and for discharging a collected quantity of said items when the accumulated weight thereof matches a target weight, said apparatus comprising:

a container including an item receiving surface for receiving items delivered by said feeder to said output location, said item receiving surface mounted for movement between a first position whereat said surface is located close to said output location to minimize the drop height to said surface and a second position whereat said surface is located further from said output location to enable the container to accumulate an increased volume of items;

a weighing device for monitoring the weight of items as they accumulate in said container;

a controller responsive to said weighing device for causing said item receiving surface to move from said first position toward said second position while said container continues to receive items from said output location; and a gate mechanism actuatable by said controller for discharging the items accumulated in said container when the weight thereof matches said target weight.

6. The apparatus of claim 5 wherein said receiving surface is mounted for rotation between said first and second positions; and an actuator responsive to said controller for rotating said receiving surface.

* * * * *